United States Patent
Nguyen et al.

(10) Patent No.: US 9,909,499 B2
(45) Date of Patent: Mar. 6, 2018

(54) FUEL DRAINAGE AND PURGE SYSTEM AND METHOD

(71) Applicant: General Electric Company, Schenectady, NY (US)

(72) Inventors: Tho Vankhanh Nguyen, Cypress, TX (US); Tuy Cam Huynh, Sugar Land, TX (US); Luis Alejandro Gutierrez Gonzalez, El Marques (MX); Jose Luis Campos Orozco, Paseos del Pedregal (MX); Imran Ali Khan, Spring, TX (US); Horacio Solis Godinez, Col Milenio III (MX)

(73) Assignee: General Electric Company, Schenectady, NY (US)

( * ) Notice: Subject to any disclaimer, the term of this patent is extended or adjusted under 35 U.S.C. 154(b) by 698 days.

(21) Appl. No.: 14/245,927

(22) Filed: Apr. 4, 2014

(65) Prior Publication Data

US 2015/0285149 A1 Oct. 8, 2015

(51) Int. Cl.
*F02C 7/22* (2006.01)
*F02C 7/232* (2006.01)

(52) U.S. Cl.
CPC ........ *F02C 7/232* (2013.01); *F05D 2260/602* (2013.01); *F23K 2301/203* (2013.01)

(58) Field of Classification Search
CPC .... F02C 7/232; F02C 7/222; F05D 2260/602; F23K 2301/203; F23K 5/18
See application file for complete search history.

(56) References Cited

U.S. PATENT DOCUMENTS

| | | | |
|---|---|---|---|
| 3,901,025 A * | 8/1975 | Bryerton | F02C 7/22 60/39.094 |
| 4,041,695 A | 8/1977 | Harper et al. | |
| 5,095,880 A * | 3/1992 | Ricks | F02D 17/04 123/198 DB |
| 6,145,294 A | 11/2000 | Traver et al. | |
| 6,438,963 B1 | 8/2002 | Traver et al. | |
| 6,729,135 B1 | 5/2004 | Norris et al. | |

(Continued)

FOREIGN PATENT DOCUMENTS

| EP | 0955457 A2 | 11/1999 |
|---|---|---|
| EP | 1306599 A2 | 5/2003 |
| EP | 2592250 A2 | 5/2013 |

OTHER PUBLICATIONS

PCT Search Report and Written Opinion issued in connection with corresponding PCT Application No. PCT/US2015/019874 dated Jun. 15, 2015.

*Primary Examiner* — Andrew Nguyen
(74) *Attorney, Agent, or Firm* — Fletcher Yoder, P.C.

(57) ABSTRACT

Embodiments of the present disclosure are directed toward a system and method to drain a fuel manifold wherein a fuel drainage and purge system includes a fuel manifold and a drainage line extending from the fuel manifold. The drainage line is configured to flow a liquid-gas mixture from the fuel manifold. The fuel drainage and purge system also includes a drain valve disposed along the drainage line, a vent line extending from the drainage line upstream of the drain valve, a vent valve disposed along the vent line, and a drainage trap arranged along the drainage line downstream of the drain valve. The drainage trap is configured to separate the liquid-gas mixture into a liquid stream and a gaseous stream.

17 Claims, 7 Drawing Sheets

(56) References Cited

U.S. PATENT DOCUMENTS

| | | |
|---|---|---|
| 7,726,112 B2 | 6/2010 | Dooley |
| 8,340,886 B2 | 12/2012 | Nenmeni et al. |
| 2008/0115483 A1 | 5/2008 | Moore et al. |
| 2009/0165435 A1 | 7/2009 | Koranek |
| 2009/0313999 A1* | 12/2009 | Hunter .................... F01D 25/18 60/772 |
| 2012/0137699 A1 | 6/2012 | Montagne et al. |

* cited by examiner

FUEL DRAINAGE AND PURGE SYSTEM AND METHOD

BACKGROUND

The subject matter disclosed herein relates to gas turbine engines and, more particularly, to a system and method for draining and purging gas turbine engine manifolds.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Gas turbine systems generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft. Occasionally, the gas turbine system may undergo service and/or maintenance procedures, and thus may be shut down for such procedures. Accordingly, it may be desirable to improve aspects of the gas turbine system to improve serviceability of the system during such shut down conditions.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine fuel drainage and purge system of a gas turbine engine. The fuel drainage and purge system includes a fuel manifold and a drainage line extending from the fuel manifold. The drainage line is configured to flow a liquid-gas mixture from the fuel manifold. The fuel drainage and purge system also includes a drain valve disposed along the drainage line, a vent line extending from the drainage line upstream of the drain valve, a vent valve disposed along the vent line, and a drainage trap arranged along the drainage line downstream of the drain valve. The drainage trap is configured to separate the liquid-gas mixture into a liquid stream and a gaseous stream.

In a second embodiment, a system includes a drainage line extending from a fuel manifold of a gas turbine engine. The drainage line is configured to flow a liquid-gas mixture from the fuel manifold. The system also includes a drain valve disposed along the drainage line, a vent line extending from the drainage line upstream of the drain valve, a vent valve disposed along the vent line, and a drainage trap arranged along the drainage line downstream of the drain valve. The drainage trap is configured to separate the liquid-gas mixture into a liquid stream and a gaseous stream. The system also includes a controller. The controller is configured to regulate operation of the drain valve and the vent valve.

In a third embodiment, a system includes a drainage trap arranged along a drainage line. The drainage trap is downstream of a drain valve. The drainage trap is designed to separate a liquid-gas mixture into a liquid stream and a gaseous stream. The system also includes a controller coupled to the drain valve and a vent valve. The controller is designed to regulate operation of the drain valve and the vent valve based on feedback from one or more sensors. The one or more sensors measure an operating parameter of the system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
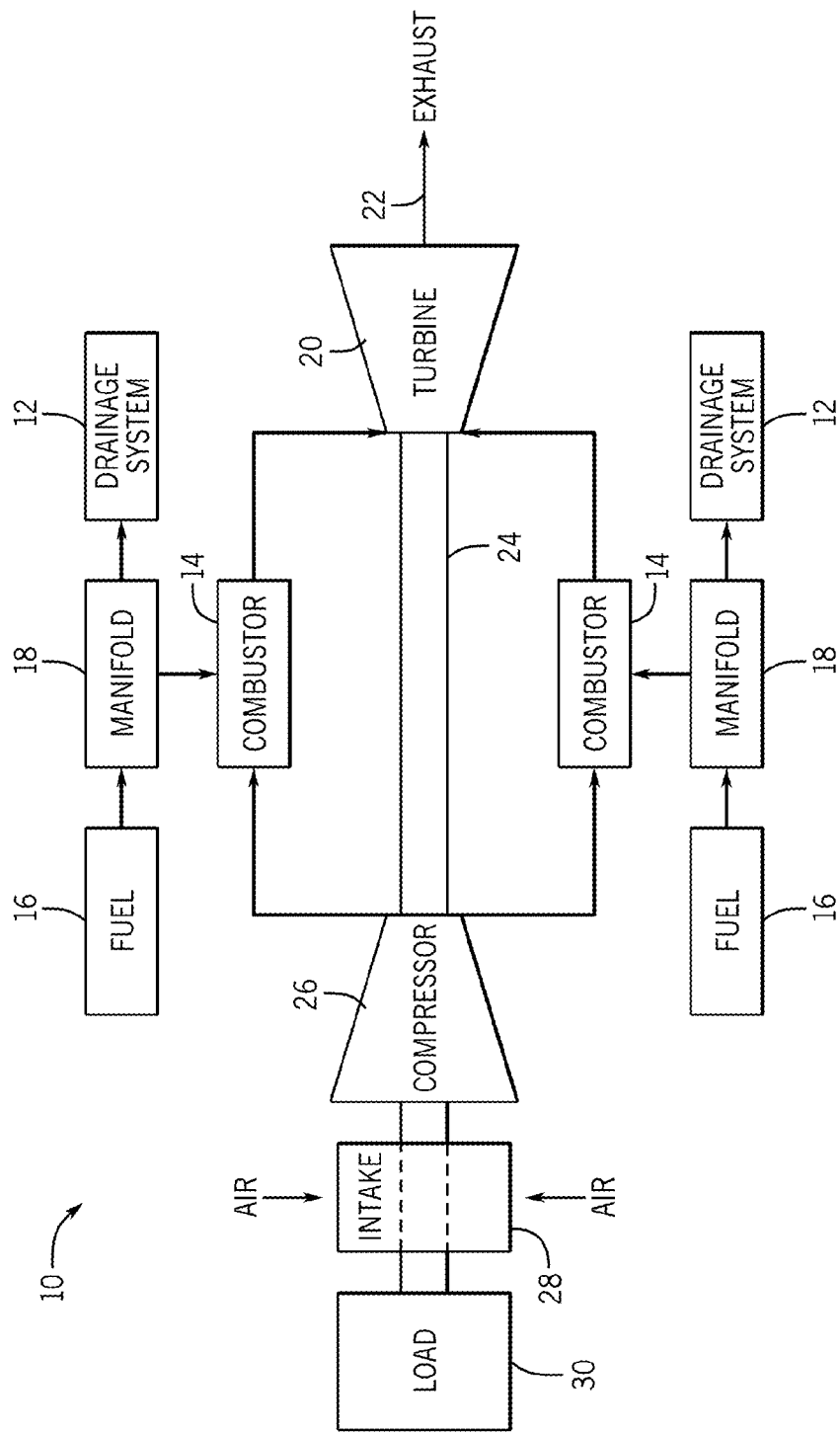
FIG. 1 is a block diagram of a gas turbine system, in accordance with an embodiment of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure provide a fuel drainage and purge system (e.g., fuel drainage system) for a gas turbine engine. The fuel drainage and purge system may be particularly useful during fuel switching, shutdown, maintenance, and/or service procedures. In particular, the fuel drainage and purge system (e.g., via control by a processor-based controller) is configured to enable draining and purging of fuel (e.g., liquid fuel, gas fuel, liquid-gas fuel mixtures) from a fuel manifold of the gas turbine engine and separation of purging air from the drained fuel. In some embodiments, the purging air may be hot (e.g., heated during compression in a compressor). For example, the fuel drainage and purge system may include a drain trap (e.g., drainage trap) to separate a mixed air/fuel stream (e.g., a liquid-gas mixture) into an air stream (e.g., a gaseous stream) and a liquid fuel stream (e.g., a liquid stream), thereby removing the hot air stream from the liquid fuel stream before the liquid fuel stream is sent to a storage tank. In other words, the air stream (e.g., purge air from a compressor discharge, purge air from back flow through fuel nozzles, purge air from an air bottle, etc.) may be directed toward the fuel manifold and facilitate drainage of the fuel from the fuel manifold. After the air stream enters the fuel manifold, it may form a mixed air/fuel stream with the fuel, and the mixed air/fuel stream may be directed toward the drain trap within the liquid fuel drainage system. In the drain trap, the mixed air/fuel stream may be separated into the air stream and the liquid fuel stream. Thereafter, the air stream may be recirculated through the fuel drainage and purge system, while the liquid fuel stream is directed toward the storage tank. By separating the liquid fuel from the hot purge air, the fuel drainage system may reduce or eliminate the use of a heat exchanger for cooling fuel drained from the fuel manifold before directing the fuel back into storage. Consequently, the fuel drainage and purge systems described below may have a smaller footprint than systems including a heat exchanger. Additionally, the fuel drainage and purge systems may have reduced complexity, thereby reducing costs, maintenance, and repairs associated with operation of the fuel drainage system.

FIG. 1 is a block diagram of an embodiment of a gas turbine system 10. As described in detail below, the disclosed gas turbine system 10 may include one or more fuel drainage and purge systems 12 (e.g., fuel drainage systems). The gas turbine system 10 may use liquid or gas fuel, such as natural gas and/or a hydrogen-rich synthetic gas, to drive the gas turbine system 10. As depicted, combustors 14 receive fuel from a fuel supply 16 through a manifold 18. The manifold 18 may include one or more fuel inputs and a plurality of passages leading to fuel outlets, such that the manifold 18 can distribute the fuel among a plurality of combustors and/or fuel nozzles. Thereafter, the combustors 14 mix the fuel with air for combustion within the combustors 14. The combustors 14 may include one or more fuel injection nozzles to enable mixture of the fuel with air.

During operation, the air/fuel mixture combusts in a chamber within the combustor 14, thereby creating hot pressurized exhaust gases. The combustor 14 directs the exhaust gases through a turbine 20 toward an exhaust outlet 22. As the exhaust gases pass through the turbine 20, the gases force turbine blades to rotate a shaft 24 along an axis of the gas turbine system 10. As illustrated, the shaft 24 may be connected to various components of the gas turbine system 10, including a compressor 26. The compressor 26 also includes blades coupled to the shaft 24. As the shaft 24 rotates, the blades within the compressor 26 also rotate, thereby compressing air from an air intake 28 through the compressor 26 and directing the air into the combustor 14. The shaft 24 may also be connected to a load 30, which may be a vehicle or a stationary load, such as an electrical generator in a power plant or a propeller on an aircraft, for example. The load 30 may include any suitable device capable of being powered by the rotational output of the gas turbine system 10. Moreover, in some embodiments, the load 30 may be located on the turbine 20 side of the gas turbine system 10.

As mentioned above, the gas turbine system 10 includes the fuel drainage and purge system 12. As described in detail below, the fuel drainage and purge system 12 (e.g., via control by a processor-based controller) is configured to direct the liquid fuel stream toward the storage tank. More specifically, the fuel drainage and purge system 12 may receive the mixed air/fuel stream from the manifold 18. The mixed air/fuel stream may be the result of the hot purge air (e.g., heated purge air due to compression in the compressor 26) from the compressor 26 directed toward the manifold 18 mixing with the fuel remaining in the manifold 18 after a shut down or fuel switching event (e.g., switching between different liquid fuels, gas fuels, gas and liquid fuels, or any combination thereof). That is, the hot purge air may be directed toward the manifold 18 from the compressor 26 when the compressor is at full speed or slowing down (e.g., when combustion in the combustor 14 has stopped occurring but the turbine 20 is still rotating due to momentum/stored energy). Thereafter, the mixed air/fuel stream may be directed toward a drain trap, where the air stream may be separated from the fuel stream. As a result, the hot air stream is removed from the liquid fuel stream, reducing the temperature of the liquid fuel stream before the liquid fuel stream enters the storage tank. In this manner, additional cooling of the liquid fuel stream may be reduced or eliminated.

Figure 2:
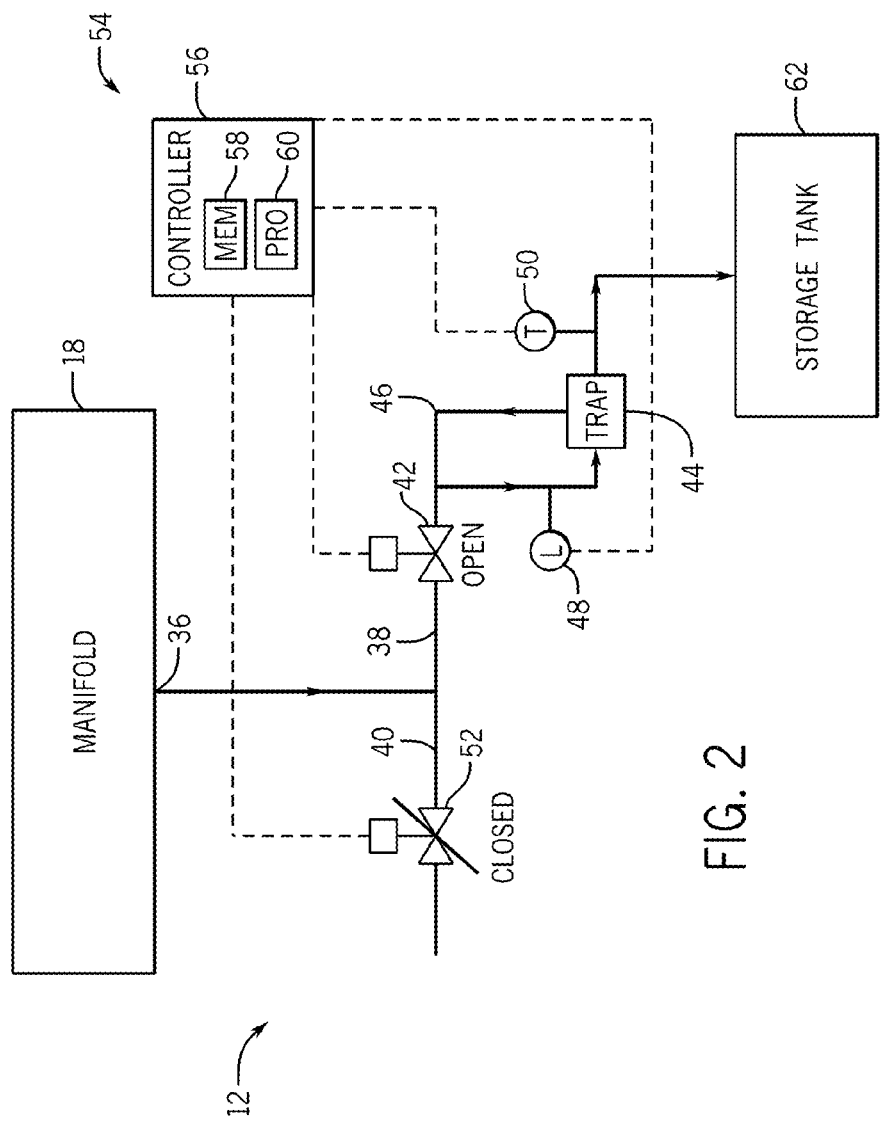
FIG. 2 is a block diagram of a fuel drainage and purge system of the gas turbine system, in accordance with an embodiment of the present disclosure.

FIG. 2 is a block diagram of the fuel drainage and purge system 12. As shown, the fuel drainage and purge system 12 is fluidly coupled to the manifold 18 at an outlet 36. In this manner, the fuel drainage and purge system 12 receives fluid (e.g., liquid fuel, gaseous fuel, fuel mixtures, purge air, air/fuel mixtures, etc.) from the manifold 18 during a shut down, fuel switching event, or routine purge. For example, the manifold 18 may be purged with air from the compressor 26. That is, the hot air stream from the compressor 26 may mix with the liquid fuel stream in the manifold 18. As mentioned above, the air from the compressor 26 may be hotter than the liquid fuel in the manifold 18. However, in other embodiments, the fuel drainage and purge system 12 may receive just the air stream or just the liquid fuel stream. In the illustrated embodiment, the mixed air/fuel stream is directed toward a drain line 38. Additionally, the fuel drainage and purge system 12 also includes a vent line 40. For example, the drain line 38 and the vent line 40 may be conduits formed from metal piping (e.g., carbon steel, stainless steel, etc.), plastic piping (e.g., PVC), or a combination thereof. In some embodiments, the components of the fuel drainage and purge system 12 may conform to an industry code (e.g., ASME, API, etc.). Moreover, the drain line 38 and the vent line 40 may be at a lower elevation or position relative to the manifold 18 to cause fluid to drain by gravity through the fuel drainage and purge system 12. In certain embodiments, a valve (e.g., a block valve) may be arranged at the outlet 36.

The drain line 38 may include a drain valve 42 (e.g., controlled by controller 56) to regulate the flow of fluid through the drain line 38. For example, in a closed position, the drain valve 42 may substantially block the flow of fluid through the drain line 38. However, in an open or partially open position, the drain valve 42 may direct fluid from the manifold 18 through the drain line 38. In one embodiment, the drain valve 42 may be a solenoid valve. However, various types of actuators may be attached to a variety of valves and be utilized with the present disclosure. For example, the drain valve 42 may be a globe valve with a mechanical or electrical actuator. The drain valve 42 may be formed from a variety of materials including metals, polymers, or combinations of different materials. For example, the drain valve 42 may have a carbon steel body with stainless steel trim and polymer packing.

In the illustrated embodiment, a drain trap 44 is arranged in the drain line 38 downstream of the drain valve 42. As described above, the drain trap 44 receives the mixed air/fuel stream after it passes through the drain valve 42. The drain trap 44 may separate the mixed air/fuel stream into the liquid fuel stream and the air stream. As mentioned above, the drain trap 44 may be any type of separator that can separate a mixed fluid stream into the component streams. For example, the drain trap 44 may be a "floating ball" type separator. That is, the drain trap 44 may have a ball in an interior chamber that blocks an outlet port. The ball may block or restrict the outlet port when no liquid or a small amount of liquid is in the drain trap 44. Alternatively, the ball may not block or restrict the outlet when a particular amount of liquid accumulates in the drain trap 44 and the ball is lifted (e.g., "floated") off of the outlet port. In other words, the ball will float on top of the accumulated liquid level and expose the outlet port. In this manner, liquid fuel may drain from the drain trap 44 through the outlet port. Additionally, the air stream may be directed out of the drain trap 44 through a vent. The drain trap 44 may be constructed of a variety of components including metals, polymers, and the like.

As described above, the drain trap 44 may include a vent. A recirculation line 46 may be fluidly coupled to the vent of the drain trap 44. The recirculation line 46 may direct the air stream from the drain trap 44 back into the drain line 38. For example, in the illustrated embodiment, the recirculation line 46 is configured to direct the air stream to a point in the drain line 38 that is upstream of the drain trap 44 and downstream of the drain valve 42. As such, the air stream may reenter the drain line 38 and subsequently the drain trap 44.

As described in detail below, the fuel drainage and purge system 12 may also include various instrumentation components to facilitate management and operation of the fuel drainage and purge system 12. For instance, a level switch 48 may be arranged along the drain line 38. The level switch 48 may monitor a fluid level in the drain line 38. The level switch 48 may be coupled to and/or incorporated into a level sensor. For example, the level switch 48 could be used along with a float level sensor. However, in other embodiments, different level sensors may be used such as ultrasonic, capacitive, and the like. The level switch 48 may receive signals from level sensors located at numerous locations throughout the gas turbine system 10. For example, a level sensor may be integrated into the level switch 48 arranged upstream of the drain trap 44, as depicted in the illustrated embodiment, and an additional level sensor may monitor the level in the manifold 18. Furthermore, more than one level switch 48 may be incorporated into the fuel drainage and purge system 12. As will be described in detail below, the level switch 48 may be incorporated into a control system 54 that changes drainage procedures based on feedback from the level switch 48.

To further manage the operation of the fuel drainage and purge system 12, additional instrumentation may also be included. For example, a temperature sensor 50 may be arranged downstream of the drain trap 44. The temperature sensor 50 may monitor the temperature of the liquid fuel stream leaving the drain trap 44. In some embodiments, the temperature sensor 50 may be a thermocouple inserted into the drain line 38. However, other sensors that may detect the temperature of a flowing line may also be used. Similarly to the level switch 48, the temperature sensor 50 may also be incorporated into the control system 54, as described below.

As previously mentioned, the fuel drainage and purge system 12 also includes a vent line 40. In the depicted embodiment, a vent valve 52 in the vent line 40 is in the closed position. Accordingly, there is substantially no flow through the vent line 40. However, in another embodiment, the vent valve 52 may be in an open position and the drain valve 42 may be in the closed position (e.g., FIG. 3). When liquid fuel is present in the manifold 18 or the drain line 38, the vent valve 52 may be in the closed position (e.g., a first position of the vent valve 52) while the drain valve 42 is in the open position (e.g., first position of the drain valve 42). However, once the manifold 18 or drain line 38 is drained and/or purged, the drain valve 42 may be moved to the closed position (e.g., a second position of the drain valve 42) and the vent valve 52 may be moved to the open position (e.g., a second position of the vent valve 52). When the vent valve 52 is in the open position, the air stream (e.g., purge air from the compressor 26) may be directed toward an atmospheric vent along the vent line 40. However, in other embodiments, the vent line 40 may direct the air stream toward a containment vessel or to another process unit (e.g., instrument air system). Similarly to the drain valve 42, the vent valve 52 may be a solenoid valve constructed from a variety of materials. Furthermore other types of actuators (e.g., mechanical, electrical, etc.) may be used.

As previously mentioned, instrumentation may be used to manage the fuel drainage and purge system 12 using a control system 54. The control system 54 may be operatively connected (e.g., electrically, pneumatically, etc.) to the drain valve 42, the level switch 48, the temperature sensor 50, the vent valve 52, and/or other instrumentation not shown. That is, the control system 54 may regulate the operation of the instrumentation associated with the fuel drainage system 12 (e.g., the drain valve 42, the vent valve 52, etc.). Moreover, the control system 54 may also be configured to send and/or receive signals (e.g., electrical impulses, computer readable code, etc.) indicative of process information. The signals may also be sent to a control room or directly to an operator (not pictured). Furthermore, the control system 54 may receive process information from other instrumentation not part of the fuel drainage and purge system 12. For example, the control system 54 may receive a signal indicating that the gas turbine system 10 has been shut down.

The control system 54 includes a controller 56, a processor 58, and a non-transitory machine readable memory 60. The memory 60 (e.g., ROM, flash memory, a hard drive, etc.) may have encoded processing instructions. For example, the memory 60 may have stored threshold values for certain process conditions, such as the temperature of the liquid fuel stream in the drain line 38. The controller 56 may send a control signal to the drain valve 42 and/or the vent valve 52 to enable movement between the open and closed positions. For example, in an embodiment where the drain valve 42 is a solenoid valve, the controller 56 may send the control signal to the drain valve 42 in the form of an electrical impulse. The electrical impulse may energize a coil within the drain valve 42, causing a plunger to move into the open position (e.g., a position that enables flow through the drain valve 42). Moreover, the control system 54 may also receive signals from the level switch 48 and/or temperature sensor 50 indicative of properties of the drain line 38. For example, the temperature sensor 50 may send a temperature signal to the control system 54 indicating a measured temperature of the liquid fuel stream in the drain line 38. The processor 58 may use code stored on the memory 60 to compare the measured temperature to a threshold temperature. If the measured temperature is higher than the threshold temperature, the controller 56 may send an alarm signal to the operator that the temperature in the drain line 38 is higher than the threshold temperature. Alternatively, when the measured temperature exceeds the threshold temperature, the controller may send the control signal to the drain valve 42 causing the drain valve 42 to close as described above. As such, the control system 54 may use one or more sensors (e.g., the temperature sensor 50, the level switch 48) to monitor process parameters within the fuel drainage system 12 and relay the alarm signal or change draining procedures (e.g., regulate operation of the drain valve 42 and/or vent valve 52) based on the parameters measured by the one or more sensors.

In the embodiment shown in FIG. 2, the drain valve 42 is in the open position and the vent valve 52 is in the closed position. Accordingly, the mixed air/fuel stream will flow from the manifold 18 to the drain line 38 and through the drain valve 42. As mentioned above, the manifold 18 may be purged with hot air from the compressor 26. After exiting the drain valve 42, the mixed air/fuel stream will enter the drain trap 44. In the drain trap 44, the air stream used to purge the manifold 18 and the liquid fuel stream will be separated into individual streams. The operation of the drain trap 44 is described in further detail below. In the manner described below, the air stream will be recirculated to the drain line 38 through the recirculation line 46, while the liquid fuel stream exits the drain trap 44 and continues to a storage tank 62. By separating the air stream from the liquid fuel stream, the liquid fuel stream may not be as hot when it is directed to the storage tank 62. As a result, less cooling may be used to bring the liquid fuel stream to substantially ambient temperature. In other words, the removal of the hot air stream may be sufficient to not increase and/or reduce the temperature of the liquid fuel stream without passing through supplemental cooling units (e.g., a heat exchanger).

Figure 3:
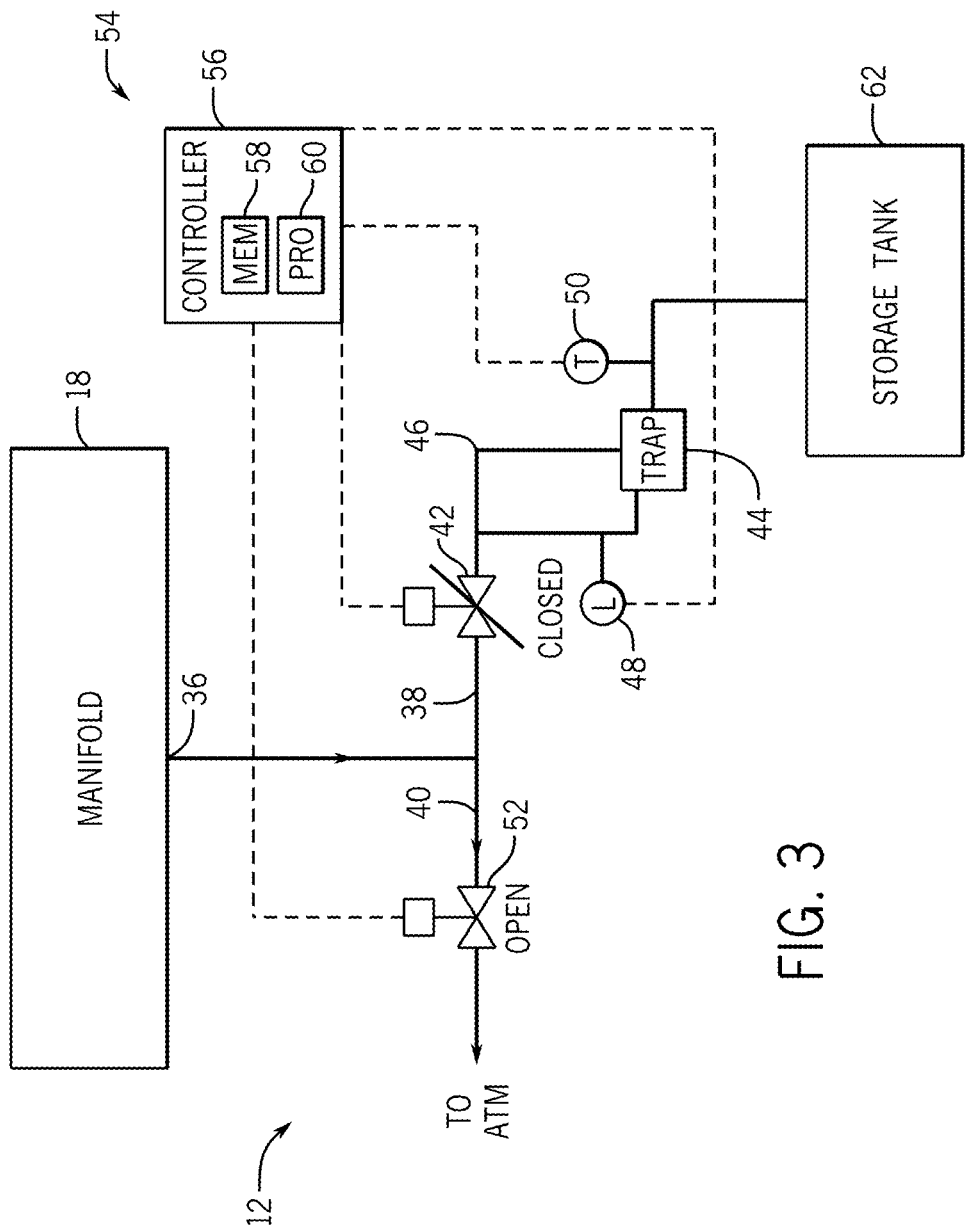
FIG. 3 is a block diagram of a fuel drainage and purge system of the gas turbine system, in accordance with an embodiment of the present disclosure.

The manifold 18 may be purged and vented after the liquid fuel is drained. To vent the manifold 18, the vent valve 52 may be opened and the drain valve 42 may be closed. For example, FIG. 3 is an embodiment of the fuel drainage and purge system 12 with the vent valve 52 in the open position. The vent valve 52 is moved to the open position after substantially all of the liquid fuel is drained to the storage tank 62. That is, the vent valve 52 is initially in the closed position when the manifold 18 is purged by the air stream from the compressor 26. The vent valve 52 remains in the closed position when the mixed air/fuel stream flows to the drain line 38, continues through the drain valve 42, separates in the drain trap 44, and finally when the liquid fuel stream enters the storage tank 62. However, after the liquid fuel stream is out of the manifold 18 and in the storage tank 62, the remaining air stream flowing through the manifold 18 from the compressor 26 is redirected to the vent line 40 by closing the drain valve 42. Thereafter, the air stream is directed through to the vent valve 52, which may be moved to the open position after the drain valve 42 is closed.

The vent valve 52 may be moved to the open position in response to process conditions. For example, the level switch 48 may detect a low liquid level in the drain line 38 or the manifold 18 and send a level signal to the control system 54 indicating the low level (e.g., a measured level of liquid). Based on the signal received from the level switch 48, the control system 54 may send the control signal to close the drain valve 42 and open the vent valve 52. For example, the processor 58 may receive the level signal sent to the control system 54 and use the encoded processing instructions stored on the memory 60 to determine the liquid level is below a level threshold. Then, the controller 56 may send the control signal to the drain valve 42 and/or the vent valve 52. The drain valve 42 may be moved to the closed position while the vent valve 52 is moved to the open position. Accordingly, the air stream may flow through the vent line 40 and to an atmospheric vent.

In another embodiment, the temperature sensor 50 may measure the temperature of the liquid fuel stream in the drain line 38 downstream of the drain trap 44. The temperature sensor 50 may send the temperature signal indicative of the measured temperature to the control system 54. The processor 58 may receive the temperature signal and compare it to a threshold temperature valve stored on the memory 60. The processor 58 may determine the measured temperature is above the threshold temperature. As such, the controller 56 may send the control signal to the drain valve 42 and/or the vent valve 52 to induce movement of the drain valve 42 to the closed position and/or induce movement of the vent valve 52 to the open position. That is, the controller 56 may send a control signal to redirect flow from the drain line 38 to the vent line 40. As a result, the liquid fuel stream with a temperature above the threshold value will not continue to flow toward the storage tank 62.

As discussed above, the control system 54 may be utilized to regulate the operation of the drain valve 42 and the vent valve 52 during a shut down, fuel switching event, or routine purge. For example, during a start up or steady state mode the control system 54 may send signals to the drain valve 42 and/or the vent valve 52 to remain in or move to the closed position. Next, the control system 54 may enter a drainage mode where the control system 54 sends the control signal to the drain valve 42 to move to the open position. Then, the control system 54 may enter a vent mode based on a signal from one or more sensors (e.g., the temperature sensor 50, the level switch 48, etc.) where the control system 54 may send the control signal to the drain valve 42 to move to the closed position and to the vent valve 52 to move to the open position. Next, the control system 54 may send the control signal to the vent valve 52 to move to the closed system during a shut down mode. The modes of the control system 54 may coincide with procedures of the gas turbine system 10 (e.g., a turbine start up mode, a turbine steady state mode, a turbine shut down mode, etc.). For example, the control system 54 may enter the drainage mode when the gas turbine system 10 begins the turbine shut down mode.

Figure 4:
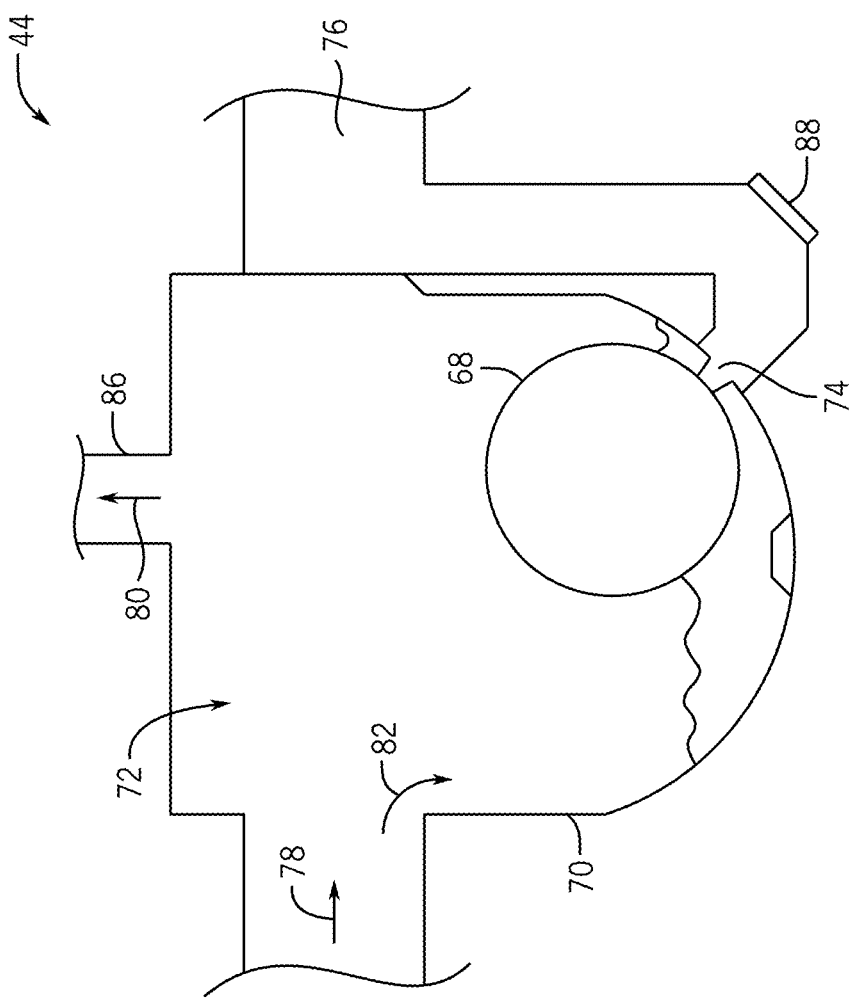
FIG. 4 is a cross-sectional side view of a drain trap of the fuel drainage system, in accordance with an embodiment of the present disclosure.
Figure 5:
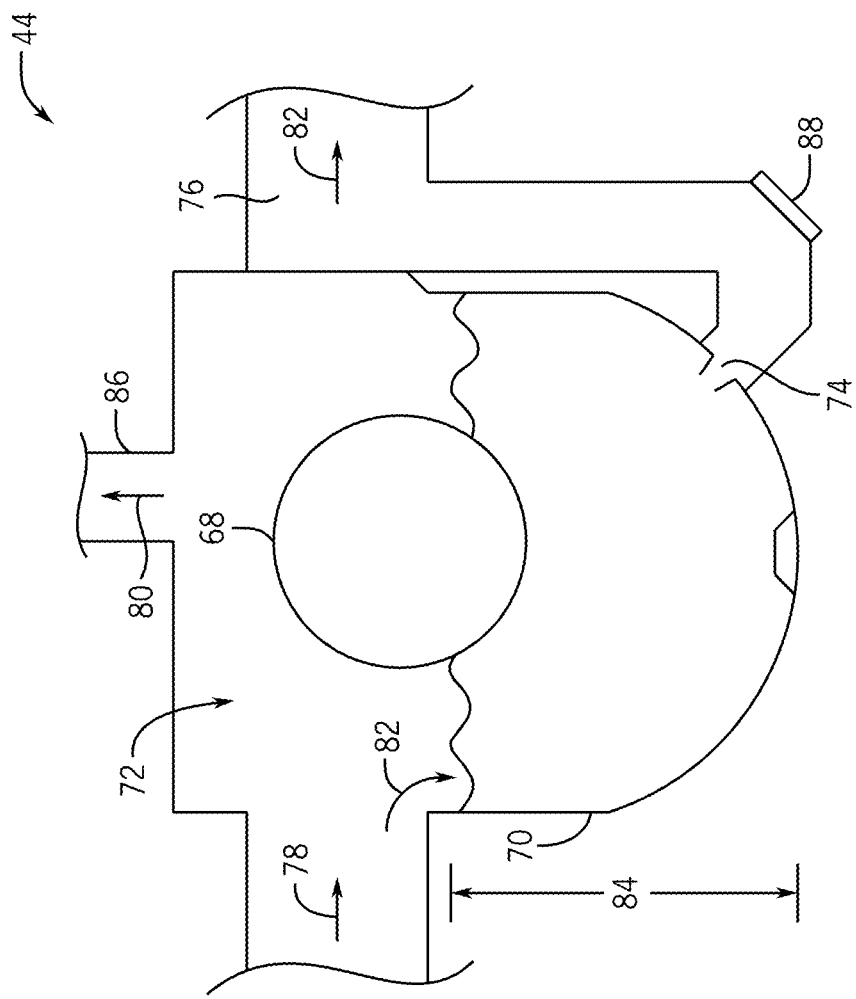
FIG. 5 is a cross-sectional side view of a drain trap of the fuel drainage system, in accordance with an embodiment of the present disclosure.
Figure 6:
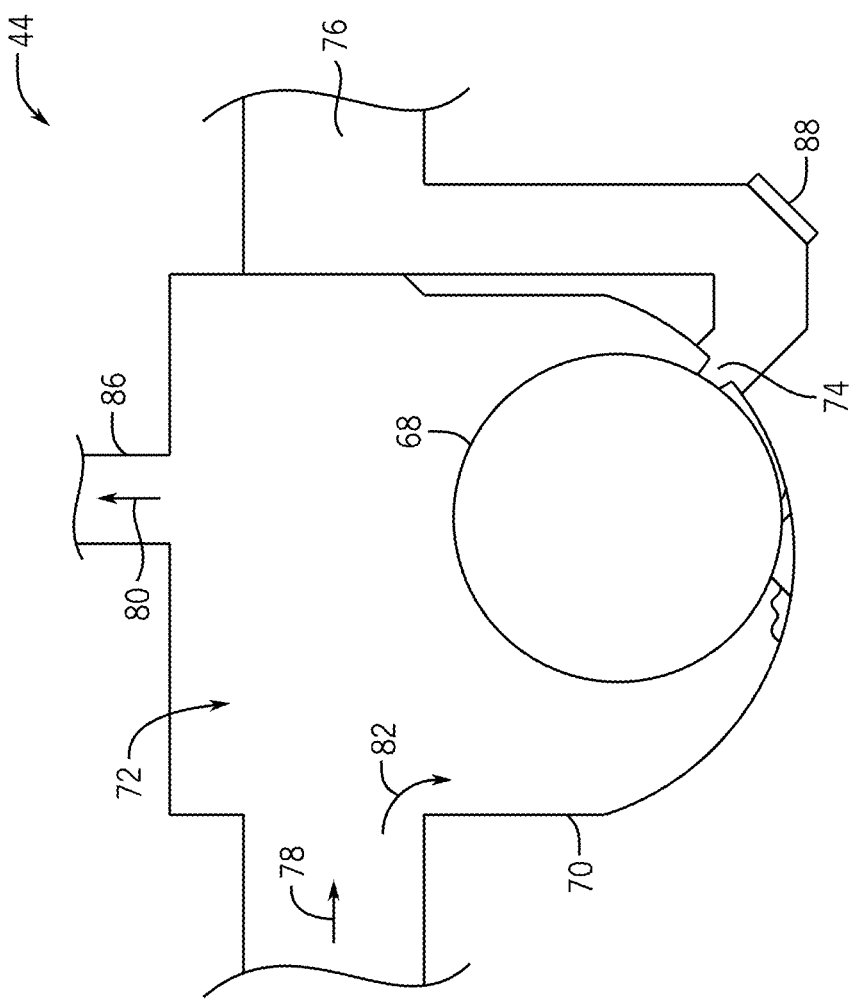
FIG. 6 is a cross-sectional side view of a drain trap of the fuel drainage system, in accordance with an embodiment of the present disclosure.

As mentioned above, the drain trap 44 may separate the mixed air/fuel stream. FIGS. 4-6 are cross-sectional side views of embodiments of the drain trap 44 illustrating the separation of the mixed air/fuel stream. In the embodiment shown in FIG. 4, a ball 68 is disposed within a body 70 of the drain trap 44. The body 70 of the drain trap 44 has an interior volume 72 that is larger than the volume of the ball 68. That is, the interior volume 72 is large enough to accommodate the ball 68, the mixed air/fuel stream, and a liquid level. The ball 68 may impede or substantially block flow through a port 74 leading to a trap outlet 76 when there is little or no fluid in the drain trap 44. In other words, without a liquid level in the interior volume 72, the ball 68 blocks or restricts the trap outlet 76. As described above, as a mixed air/fuel stream 78 enters the drain trap 44, the mixed air/fuel stream 78 will separate into an air stream 80 and a liquid fuel stream 82. The liquid fuel stream 82 may accumulate in the interior volume 72. That is, the liquid fuel stream 82 may "drop out" of the mixed air/fuel stream 78 and accumulate within the interior volume 72, because of the blockage of the port 74. The air stream 80 exits the drain trap 44 through a recirculation outlet 86. As shown in FIG. 4, as the liquid fuel stream 82 accumulates in the drain trap 44, the ball 68 begins to float on top of the liquid. However, in the depicted embodiment, a sufficient liquid level has not accumulated to fully lift the ball 68 from the port 74.

Turning to FIG. 5, the ball 68 is floating on a liquid level 84 in the illustrated embodiment. The ball 68 may be designed to have a density less than the liquid fuel stream 82. As shown, the liquid level 84 is sufficiently high to lift the ball 68 off of the port 74. When the ball 68 no longer blocks or restricts the port 74, the liquid fuel stream 82 freely flows out of the trap outlet 76 toward the storage tank 62. Moreover, the air stream 80 may continue to exit the drain trap 44 through the recirculation outlet 86. Continuing to FIG. 6, the liquid level 84 in the interior volume 72 has dropped. That is, the liquid fuel stream 82 has flowed out of the drain trap 44 through the port 74. As a result, the ball 68 has returned to a position that blocks or restricts the port 74. In some cases, a quantity of the liquid fuel stream 82 may remain in a space between the port 74 and the trap outlet 76. The remaining quantity of the liquid fuel stream 82 may be drained from the space between the port 74 and the trap outlet 76 utilizing a plug 88.

Figure 7:
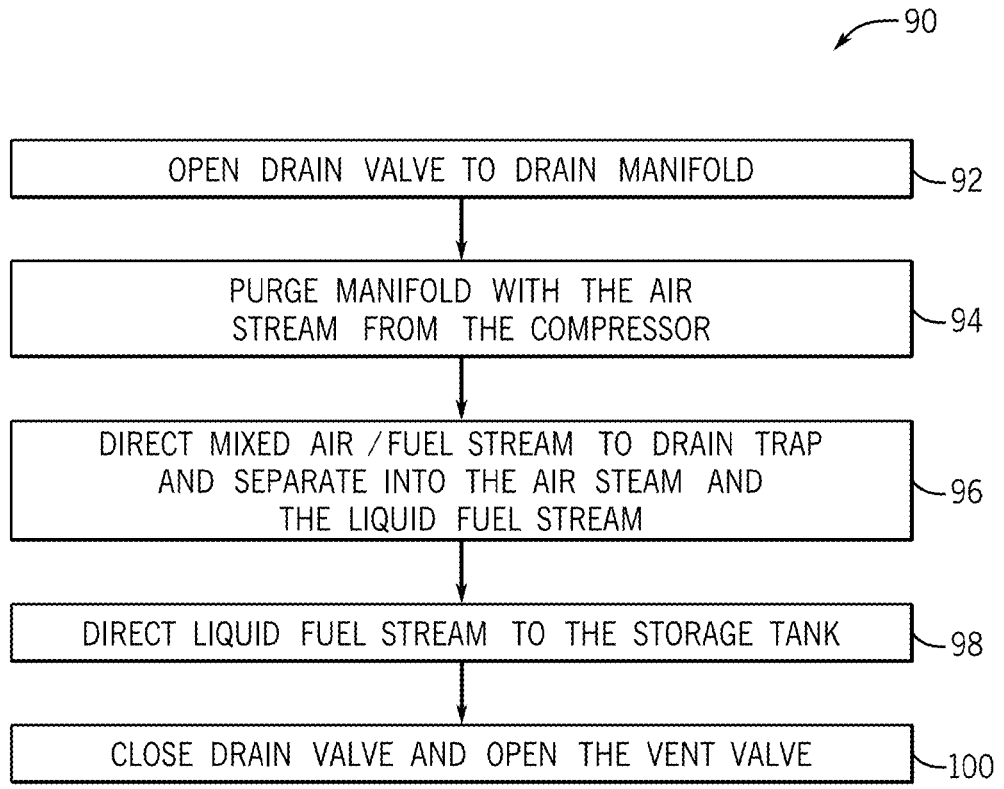
FIG. 7 is a flow chart of a method for draining a fuel manifold using a fuel drainage system, in accordance with an embodiment of the present disclosure.

FIG. 7 is a flowchart of an embodiment of a method 90 for draining the manifold 18 and/or various fuel lines of the gas turbine system 10. The drain valve 42 may be opened (e.g., using the control system 54) to enable the mixed air/fuel stream 82 to drain from the manifold 18 through the drain line 38 at step 92. The drain valve 42 may be a solenoid valve that is moved to the open position when it receives the control signal from the controller 56. Next, the manifold 18 may be purged with the air stream 80 from the compressor 26 at step 94. As the air stream 80 enters the manifold 18, it may mix with the liquid fuel stream 82. Next, the mixed air/fuel stream may enter the drain trap 44 and separate into the air stream 80 and the liquid fuel stream 82 at step 96. Then, the liquid fuel stream 82 is directed to the storage tank 62 at step 98. Next, using the controller 56, the drain valve 42 may be closed and the vent valve 52 may be opened to redirect the remaining air stream 80 to the vent line 40 at step 100.

As discussed in detail above, the disclosed embodiments include the fuel drainage and purge system 12 for the gas turbine system 10. Specifically, the fuel drainage system 12 includes the drain trap 44, which is configured to separate the mixed air/fuel stream 78 into the air stream 80 and the liquid fuel stream 82 and direct the liquid fuel stream 82 to the storage tank 62. In this manner, the liquid fuel stream 82 may be at a lower temperature when it enters the storage tank 62 than it would be if the air stream 80 was not removed without additional cooling. For example, the air stream 80 enters the manifold 18 from the compressor 26 and mixes with the liquid fuel stream 82, thereby forming the mixed air/fuel stream 78. The mixed air/fuel stream 78 may be directed toward the drain trap 44 through the drain line 38. The drain trap 44 may separate the mixed air/fuel stream 78 into the air stream 80 (e.g., a gaseous stream) and the liquid fuel stream 82 (e.g., a liquid stream), thereby removing the hot air stream 80 from the liquid fuel stream 82 before directing the liquid fuel stream 82 to the storage tank 62. Thereafter, the air stream 80 may be directed to a vent line 40 and vented to the atmosphere.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a turbine fuel drainage and purge system of a gas turbine engine, comprising:
a fuel manifold;
a drainage line extending from the fuel manifold and configured to flow a liquid-gas mixture from the fuel manifold;
a drain valve disposed along the drainage line;
a vent line extending from the drainage line upstream of the drain valve;
a vent valve disposed along the vent line; and
a drainage trap arranged along the drainage line downstream of the drain valve, wherein the drainage trap is configured to separate the liquid-gas mixture into a liquid stream and a gaseous stream, wherein the turbine fuel drainage and purge system comprises a recirculation circuit configured to recirculate the gaseous stream to the drainage line downstream of the drain valve, wherein the recirculation circuit is configured to use a compressor to provide recirculation pressure.

2. The system of claim 1, wherein the turbine fuel drainage and purge system is configured to drain the liquid stream to a storage tank.

3. The system of claim 1, wherein the drainage trap comprises a body having an interior volume and a ball disposed within the interior volume, wherein the ball has a density less than the liquid stream.

4. The system of claim 1, wherein the turbine fuel drainage and purge system comprises a controller coupled to the drain valve and the vent valve, wherein the controller is configured to regulate a first position of the drain valve and a second position of the vent valve.

5. The system of claim 4, wherein the controller is configured to regulate operation of the drain valve and/or the vent valve based on feedback from one or more sensors configured to measure an operating parameter of the turbine fuel drainage system.

6. The system of claim 5, wherein the one or more sensors comprises a level sensor configured to measure a level of fluid in the drainage line.

7. The system of claim 5, wherein the one or more sensors comprises a temperature sensor configured to measure a temperature of the liquid stream.

8. The system of claim 1, wherein the vent line is configured to direct an air stream to an atmospheric vent.

9. A system comprising:
a drainage line extending from a fuel manifold of a gas turbine engine and configured to flow a liquid-gas mixture from the fuel manifold;
a drain valve disposed along the drainage line;
a vent line extending from the drainage line upstream of the drain valve;
a vent valve disposed along the vent line;
a drainage trap arranged along the drainage line downstream of the drain valve, wherein the drainage trap is configured to separate the liquid-gas mixture into a liquid stream and a gaseous stream;
a recirculation line configured to recirculate the gaseous stream to the drainage line downstream of the drain valve, wherein the recirculation line is configured to use a compressor to provide recirculation pressure; and
a controller configured to regulate operation of the drain valve and the vent valve.

10. The system of claim 9, wherein the controller is configured to regulate operation of the drain valve and the vent valve based on feedback from one or more sensors.

11. The system of claim 10, wherein the one or more sensors comprises a level sensor configured to measure a level of fluid in the drainage line, a temperature sensor configured to measure a temperature of the liquid stream, or both.

12. The system of claim 9, wherein the drainage trap comprises a body having an interior volume and a ball disposed within the interior volume, wherein the ball has a density less than the liquid stream.

13. The system of claim 9, comprising a storage tank fluidly coupled to the drainage trap and configured to receive the liquid stream.

14. A system comprising:
a drainage trap arranged along a drainage line downstream of a drain valve, wherein the drainage trap is configured to separate a liquid-gas mixture into a liquid stream and a gaseous stream;
a compressor; and
a controller coupled to the drain valve and a vent valve, wherein the controller is configured to regulate operation of the drain valve and the vent valve based on feedback from one or more sensors configured to measure an operating parameter of the system to provide for a flow of fuel into the drainage trap and subsequent release of gas from the drainage trap to atmosphere, wherein the drainage trap comprises a recirculation circuit configured to recirculate the gaseous stream to the drainage line downstream of the drain valve, and wherein the recirculation circuit is configured to use the compressor to provide recirculation pressure.

15. The system of claim 14, wherein the one or more sensors comprises a level sensor configured to measure a level of fluid in the drainage line, a temperature sensor configured to measure a temperature of the liquid stream, or both.

16. The system of claim 15, wherein the controller is configured to regulate a position of the drain valve based on a measured temperature of the liquid stream, a measured level of liquid in the drainage line, or both.

17. The system of claim 14, comprising:
a gas turbine engine;
a fuel manifold coupled to the gas turbine engine;
the drainage line extending from the fuel manifold of the gas turbine engine and configured to flow the liquid-gas mixture from the fuel manifold;
the drain valve disposed along the drainage line;
a vent line extending from the drainage line upstream of the drain valve;
the vent valve disposed along the vent line; and
a storage tank arranged downstream of the drainage trap, wherein the storage tank is configured to receive the liquid stream from the drainage trap.

* * * * *